Nov. 26, 1968    R. J. GAFVERT ET AL    3,413,031
RUMBLE SEAT INSERT FOR AUTOMOBILE
Filed Nov. 8, 1966                    3 Sheets-Sheet 1
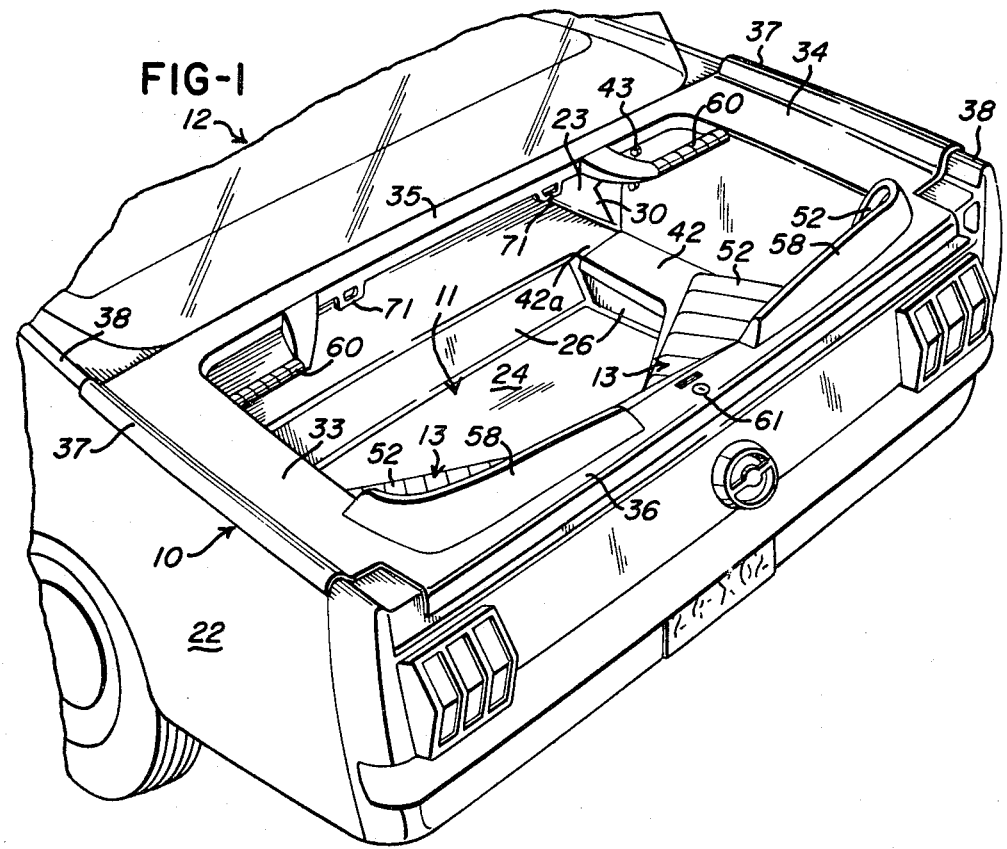
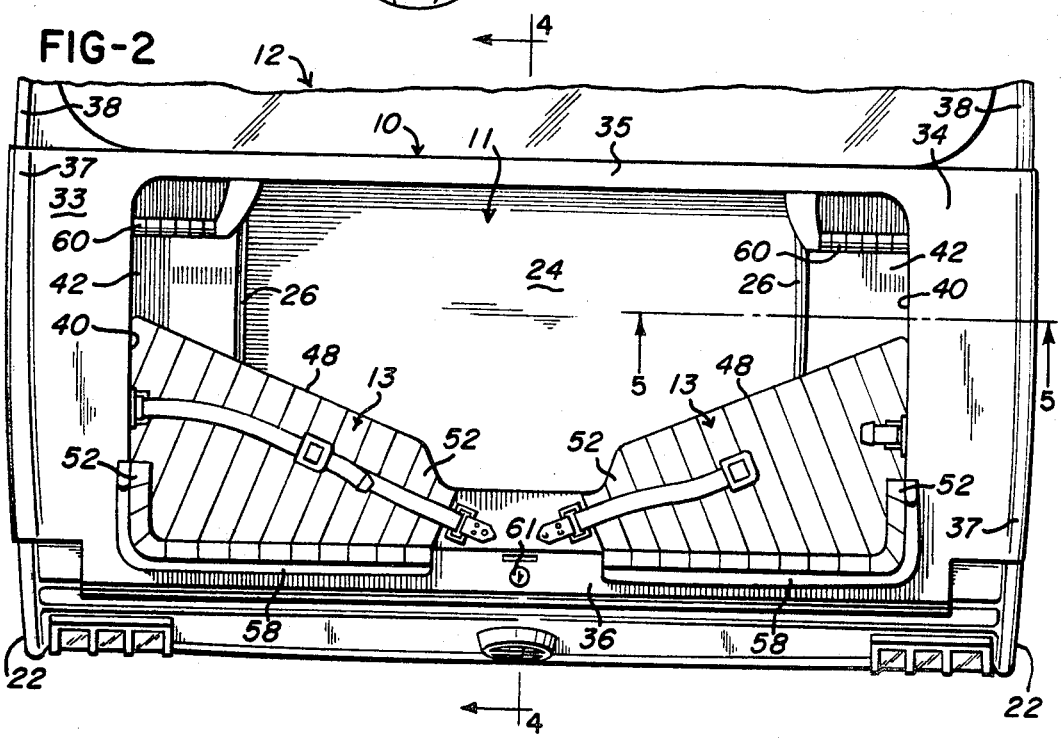

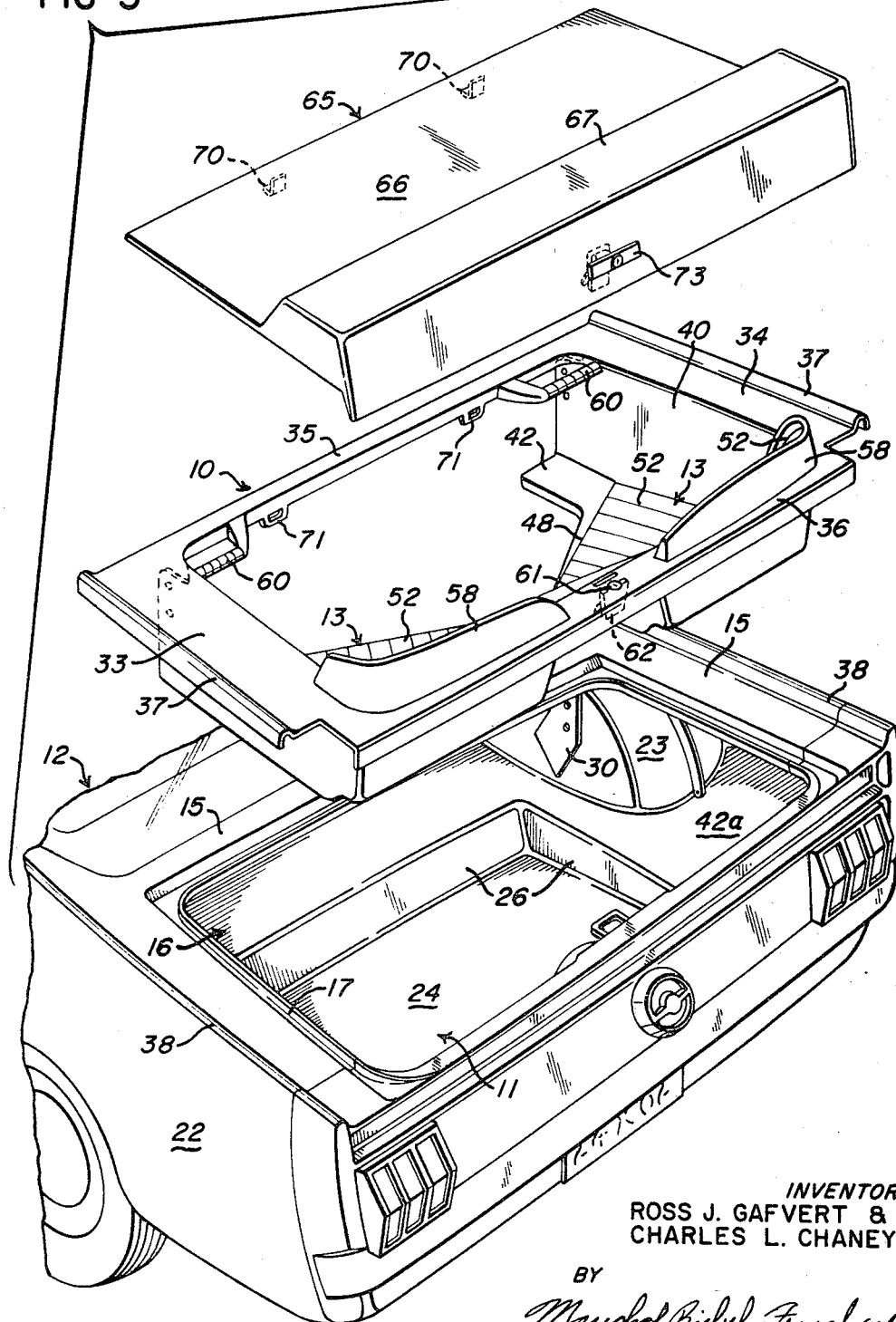

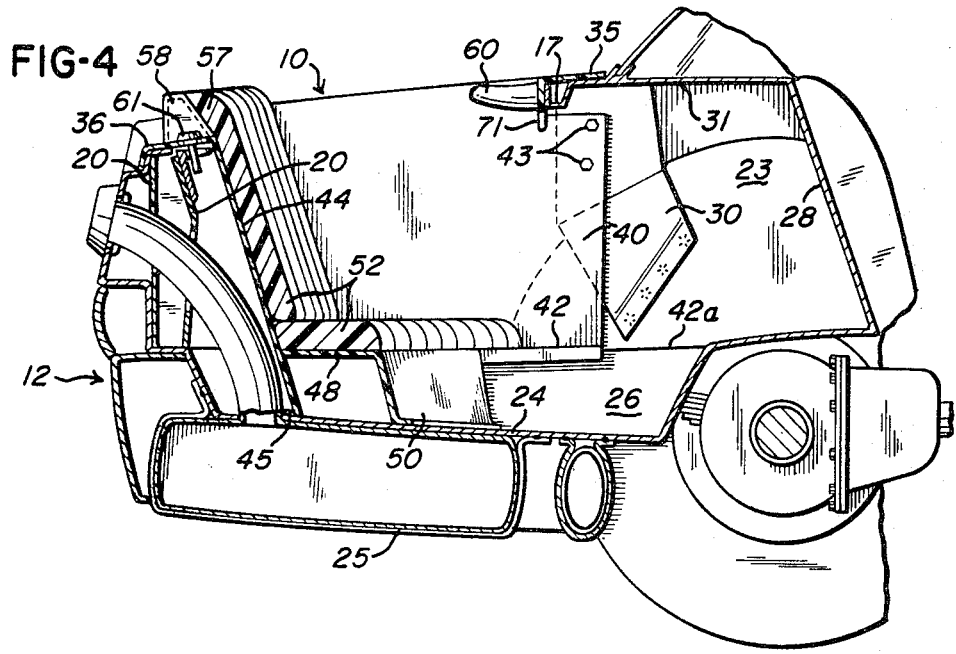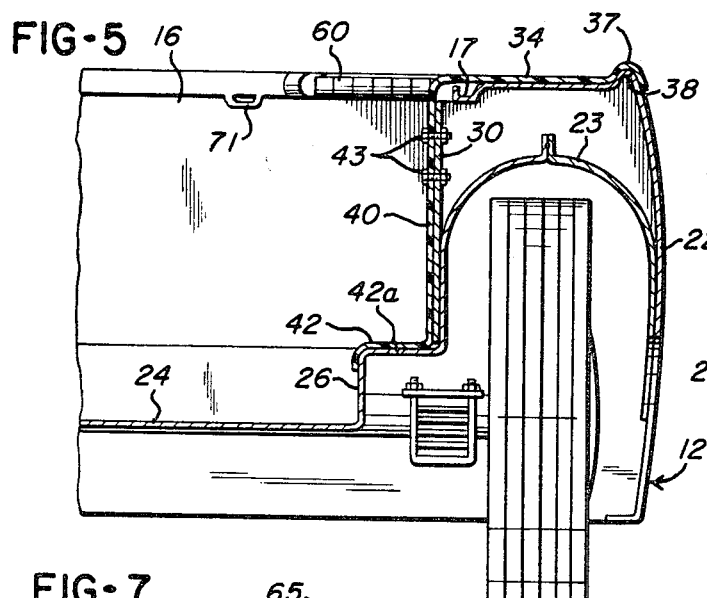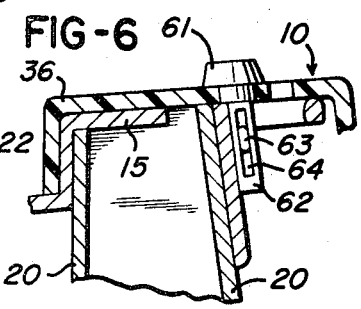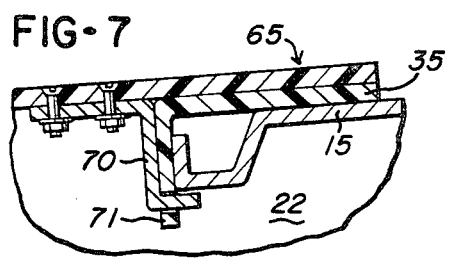

United States Patent Office 3,413,031
Patented Nov. 26, 1968

3,413,031
RUMBLE SEAT INSERT FOR AUTOMOBILE
Ross J. Gafvert and Charles L. Chaney, Yellow Springs, Ohio, assignors to Zetetics Corporation, Yellow Springs, Ohio, a corporation of Ohio
Filed Nov. 8, 1966, Ser. No. 592,798
6 Claims. (Cl. 296—63)

ABSTRACT OF THE DISCLOSURE

An auxiliary seat for insertion into the trunk cavity of a standard automobile when the trunk lid has been completely removed. The auxiliary seat is formed as an integral unit and has a horizontal deck portion which engages the trunk deck of the automobile. The deck portion has an opening in the center thereof which aligns with the opening of the trunk cavity. Side walls are secured to the hinge connections for the trunk lid and a rear portion of the seat is secured to the latch connection. Seats are formed on the bottom ledge to receive cushions which are also placed on the rear wall, and a removable cover is provided for completely enclosing the top of the auxiliary seat.

---

This invention relates to an auxiliary seat device adapted to be inserted into the trunk cavity of an automobile.

Frequently, it is desirable to increase the passenger carrying capacity of automobiles, especially the sport type automobiles which normally carry only two to four passengers. Such automobiles are provided with a rear trunk space for carrying luggage and the like which is normally not in use. The trunk is of sufficient size to accommodate two people but cannot be used unless suitable fixtures are provided to accommodate the persons.

Accordingly, an object of this invention is to provide an auxiliary seat insert which can be easily and quickly placed into the trunk cavity of a conventional automobile.

Another object of this invention is to provide a rumble seat insert which is adapted to be secured in the trunk cavity of an automobile by a single person in a matter of minutes by merely removing the trunk lid and securing the insert to the portion of the trunk lid hinge support and lock mechanism which remain in the automobile, and further to provide a seat insert wherein the trunk framework provides lateral and longitudinal structural support for the rumble seat insert.

Another object of this invention is to provide a lightweight and inexpensive auxiliary seat insert for the trunk cavity of a conventional automobile which will accommodate two persons and thus provide additional carrying capacity for the automobile and which has a suitable cover for enclosing the trunk cavity when the seat is not in use, and further to provide an insert of the aforesaid type wherein the entire assembly can be locked to the car in substantially the same manner as the trunk lid is locked in a closed position.

Other objects and advantages of the invention will be apparent from the following description, the accompanying drawings and appended claims.

In the drawings:

FIG. 1 is a perspective view showing the auxiliary seat insert mounted in the trunk cavity of an automobile;

FIG. 2 is a plan view of the auxiliary seat insert;

FIG. 3 is an exploded view showing the automobile trunk cavity, the auxiliary seat insert, and its cover;

FIG. 4 is a sectional view taken essentially along the line 4—4 of FIG. 2;

FIG. 5 is another sectional view taken along the line 5—5 of FIG. 2;

FIG. 6 is an enlarged sectional view showing the locking mechanism for the insert; and FIG. 7 is a fragmentary sectional view showing the manner in which the cover is secured in position.

Referring to the drawings wherein a preferred embodiment of the invention is shown, FIG. 1 illustrates the auxiliary seat insert 10 mounted in the trunk cavity 11 of an automobile 12. The trunk lid (not shown) of the automobile 12 has been removed and the auxiliary seat insert 10 secured in position to provide a pair of seats 13 which are adapted to accommodate two additional persons thereby increasing the passenger capacity of the automobile.

The trunk cavity 11 is surrounded by a trunk deck 15 (FIG. 3) which defines the rectangular opening 16 (FIG. 5) with the upturned drain ledge 17 around the periphery thereof. The inside of the trunk cavity 11 is defined at the rear by the rear walls 20 of the automobile body (FIG. 4) and the sides thereof are formed by the inside of the rear fenders 22 of the body and the wheel enclosures 23. The lower surface of the cavity 11 has a depression therein whose floor 24 is formed at least partially by the gasoline tank 25 and this depression has the side walls 26, as shown in FIG. 4. The forward wall 28 (FIG. 4) of the cavity 11 is substantially forward of the opening 16 (FIG. 5) and provides the passengers with room for their legs. The downwardly extending hinge members 30 are secured between the bottom portion 31 or the deck 15 and the wheel enclosures 23 (FIG. 5) and are normally used to support the trunk lid.

The auxiliary rumble seat insert 10 is preferably made of a moldable material, such as polyester plastic reinforced with fiberglass material, which can be formed into the necessary shape. The entire insert is made as a single piece and includes the right and left top portions 33 and 34 (FIG. 1) which are interconnected by the integral forward edge portion 35 and the rear edge portion 36. The side portions 33 and 34 have the deformed edges 37 (FIG. 5) at the outer end thereof for engaging the upturned edge 38 on the rear fender 22 of the automobile 12.

The inner side walls 40 of the rumble seat insert 10 are formed with the top portions 33 and 34 and extend downwardly into the cavity 11, as shown in FIG. 3, adjacent the wheel enclosures 23. The inwardly turned foot 42 on the lower end of the side walls 40 engage the floor 42a of the trunk cavity 11 to support the rumble seat insert 10. The forward ends of the insert side walls 40 are bolted to the hinge member 30 by the bolts 43, as shown in FIGS. 4 and 5, to secure rigidly the rumble seat insert 10 in position.

The rear portion 36 of the insert 10 has the downwardly slanted rear walls 44 (FIG. 4) formed integrally therewith and having a flange 45 on the lower edge thereof for engaging the floor 24 of the trunk cavity 11. In addition, the seat ledges 48 are formed integrally therewith and have vertical wall sections 50 thereon for engaging the floor 24 of the trunk cavity 11. As shown in FIG. 2, the seat ledges 48 taper outwardly from the center so that the seats are wider adjacent the side walls 40.

The expanded vinyl seat cushions 52 are then secured to the back wall and seat ledges 44 and 48 to provide comfort for the passengers. The upper portion 57 of the back cushion 52 extends above the rear portion 36 of the rumble seat insert 10 to provide additional shoulder support for the passengers, and this upper portion is reinforced by the upstanding shoulder 58 on the rear portion 36 of the insert.

The handles 60 are provided between the forward 35 and side portions 33 and 34 of the rumble seat insert 10 and form an integral part of the seat insert 10 to provide an aid for the passanger in getting into and out of the auxiliary seat as well as for use while riding, such as when the vehicles turns a sharp corner.

The rock mechanism 61 for holding the rumble seat insert 10 in place utilizes the same latch mechanism provided for the automobile trunk lid. Thus, as shown in FIG. 6, the rear portion 36 of the rumble seat insert 10 fits over the deck 15 provided on the automobile body. When a key is inserted into the lock 61 and turned, the lug 63 is withdrawn from the slot 64 in the female receptacle 62 to release the rear portion of the seat insert 10 from the automobile. When the rumble seat insert 10 is forced downwardly, the lug 63 automatically snaps into the slot 64 and locks the seat insert 10 in place in the manner similar to locking of the trunk lid. Accordingly, the lock mechanism 61 prevents unauthorized removal from the automobile of the seat insert 10.

A preferred design of a cover 65 is shown in FIG. 3 and includes a flat deck 66 with an upstanding rear portion 67 adapted to enclose the upwardly projecting portions 57 and 58 of the seat. The cover is comparable in dimension to the seat insert 10 and the downwardly extending projections 70 (FIG. 7) on the forward end thereof engage the complementary slot members 71 on the forward edge portion 35 of the insert 10. Similarly, a locking mechanism 73 is provided for locking the rear portion of the cover to the rear portion 36 of the seat insert 10 thus prohibiting unauthorized removal of the cover 65 once it is locked in place.

In operation, the auxiliary seat insert 10 may be sold either with the automobile 12 or as an accessory thereto after the original sale of the automobile. To place the seat in position, it is merely necessary to open the trunk lid in the conventional manner, and remove the appropriate connecting device which holds the trunk lid in positon. The seat insert 10 is then placed into the trunk cavity 11 so that the edge portions 33, 34 35 and 36 thereof engage the deck around the trunk opening 16. As the rear portion 36 reaches its nested position, the lug 63 snaps into position thus locking the rear end of the seat insert and prohibiting unauthorized removal thereof. The bolts 43 are then placed through the side walls 40 and into the hinge portion 30 to lock the insert rigidly in place. The seat insert 10 is thus ready for use and it is merely necessary for the passengers to occupy the seats.

When the seat insert is not in use, the cover 65 can be secured in place by first engaging the lugs 70 with the female members 71 and using the lock 73 to secure the rear portion of the cover in place. By reversing this procedure the cover can be removed. If it is desired to remove the auxiliary seat 10 so that the trunk can be used for conventional purposes, it is merely necessary to remove the bolts 43 and unlock the rear portion 36 thereof and then withdraw the trunk insert upwardly. The trunk lid can then be replaced.

While the auxiliary rumble seat insert has been shown as mounted in a particular design of automobile, it is within the scope of the invention to modify it for use in substantially all automobiles having trunk cavities of the general type shown and disclosed herein. Moreover, while a preferred embodiment of the cover 65 is shown, many different types can be used without departing from the scope of the invention. For example, a tonneau cover may be provided with snaps around the periphery of the insert to hold the same in place. The particular material from which the seat insert 10 is formed is not a limitation on this invention, and it is possible to use plastic materials as well as metals or a combination thereof.

The invention has thus provided an auxiliary seat insert which can be easily and quickly placed into the trunk cavity of an automobile to increase the passenger capacity thereof. The insert is molded into a single unit and is secured to the car in substantially the same manner as the trunk lid. A cover is provided to enclose the auxiliary seat when not in use, and the device is simple in design and inexpensive in cost for dependable operation over long periods of time.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An auxiliary rumble seat insert for insertion as a single complete unit into the trunk cavity of an automobile after the conventional trunk lid has been detached and completely removed from its hinge supports, said automobile having a latch mechanism for use in holding the trunk lid closed, said insert comprising a body having a generally horizontal deck portion defining a rectangular opening in the center thereof, said horizontal deck portion being supported by the trunk deck of the automobile around the periphery of said trunk cavity with said opening aligned with said cavity when said seat insert is in place, downwardly extending side walls integral with said body adapted to engage the bottom surface of the trunk cavity, a downwardly extending rear wall integral with said body and connected to said side walls, a bottom wall in said body rigidly supported by the lower portions of said side and end walls and resting on the floor of said trunk cavity when said insert is in place, said side and rear walls contacting the structure of the automobile which defines the trunk cavity to prohibit lateral and longtiudinal movemet of said body when said insert is in place in said trunk cavity, lock means adapted to secure said body to the automobile to hold said sea insert in place, and cushion means on said rear and bottom walls to provide comfortable support for passengers.

2. An auxiliary rumble seat insert as defined in claim 1 wherein said side walls are adapted to be releasably secured to the hinge supports of the automobile.

3. An auxiliary rumble seat insert as defined in claim 1 wherein lock means are provided to secure releasably the rear portion of said body to the latch mechanism provided in the automobile for easy removal of said insert.

4. An auxiliary rumble seat insert as defined in claim 1 wherein a removable cover is provided to enclose said opening when the auxiliary seat insert is not in use, said cover including a generally planar member adapted to be releasably hinged to one portion of said body and to be releasably locked to an opposite portion of said body.

5. An auxiliary rumble seat insert as defined in claim 1 wherein said back wall has a horizontal seat ledge formed adjacent the lower portion thereof, said ledge also adapted to receive cushions to provide a comfortable seat for passengers.

6. An auxiliary rumble seat insert as defined in claim 1 wherein said deck portion conforms to the configuration of the trunk deck to aid in seating the insert in the trunk cavity.

References Cited

UNITED STATES PATENTS

| | | | |
|---|---|---|---|
| 3,172,695 | 3/1965 | Bordinat | 296—63 |
| 3,290,086 | 12/1966 | Petrak | 296—63 |
| 3,323,828 | 6/1967 | Esche | 296—63 |

BENJAMIN HERSH, *Primary Examiner.*

L. D. MORRIS, JR., *Assistant Examiner.*